(12) United States Patent
Eliassen et al.

(10) Patent No.: US 11,329,324 B2
(45) Date of Patent: May 10, 2022

(54) ENERGY STORAGE SYSTEM

(71) Applicant: SIEMENS ENERGY AS, Oslo (NO)

(72) Inventors: Sivert Eliassen, Trondheim (NO); Roy Holen, Trondheim (NO)

(73) Assignee: SIEMENS ENERGY AS, Oslo (NO)

( * ) Notice: Subject to any disclaimer, the term of this patent is extended or adjusted under 35 U.S.C. 154(b) by 214 days.

(21) Appl. No.: 16/499,262

(22) PCT Filed: Mar. 29, 2018

(86) PCT No.: PCT/EP2018/058144
§ 371 (c)(1),
(2) Date: Sep. 28, 2019

(87) PCT Pub. No.: WO2018/184999
PCT Pub. Date: Oct. 11, 2018

(65) Prior Publication Data
US 2020/0112065 A1 Apr. 9, 2020

(30) Foreign Application Priority Data
Apr. 5, 2017 (GB) .................................... 1705518

(51) Int. Cl.
*H02J 7/00* (2006.01)
*H01M 10/42* (2006.01)
*H01M 10/04* (2006.01)
*H01M 10/44* (2006.01)

(52) U.S. Cl.
CPC ..... *H01M 10/425* (2013.01); *H01M 10/0445* (2013.01); *H01M 10/441* (2013.01); *H02J 7/0013* (2013.01); *H02J 7/00718* (2020.01)

(58) Field of Classification Search
USPC .................................. 320/116, 118, 135, 156
See application file for complete search history.

(56) References Cited

U.S. PATENT DOCUMENTS

| 6,008,627 | A | 12/1999 | Narita |
| 8,183,870 | B1 * | 5/2012 | Davies ................ H01M 10/482 |
| | | | 324/434 |
| 9,490,663 | B1 | 11/2016 | Kim et al. |
| 9,692,227 | B2 | 6/2017 | Hjertaas |
| 10,819,099 | B2 | 10/2020 | Maekawa et al. |
| 2003/0231003 | A1 * | 12/2003 | Ballard ................. H02J 7/0072 |
| | | | 320/116 |

(Continued)

FOREIGN PATENT DOCUMENTS

| DE | 102012215743 A1 * | 3/2014 | ............. B60L 58/21 |
| EP | 1533881 A2 | 5/2005 | |

(Continued)

OTHER PUBLICATIONS

International search report and written opinion dated Aug. 2, 2018 for corresponding PCT/EP2018/058144.

*Primary Examiner* — Brian Ngo

(57) ABSTRACT

An energy storage system has one or more energy storage units, each energy storage unit including one or more energy storage modules, and each energy storage module including a plurality of electrochemical energy storage devices connected in series. A DC switching device is provided in series with the or each energy storage unit. The DC switching device includes a semiconductor device and a rectifying unit in parallel with the semiconductor device.

10 Claims, 3 Drawing Sheets

(56) References Cited

U.S. PATENT DOCUMENTS

| | | |
|---|---|---|
| 2005/0134227 A1 | 6/2005 | Wozniak |
| 2009/0208821 A1 | 8/2009 | Kosugi et al. |
| 2011/0104525 A1 | 5/2011 | Kim et al. |
| 2012/0086390 A1 | 4/2012 | Lim et al. |
| 2012/0319653 A1* | 12/2012 | Kumar ................. H02J 7/0026 320/118 |
| 2013/0063091 A1 | 3/2013 | Nishi et al. |
| 2013/0163134 A1 | 6/2013 | Ji |
| 2013/0329327 A1 | 12/2013 | Zara et al. |
| 2014/0028268 A1* | 1/2014 | Bourgeois ............ H02J 7/0049 320/156 |
| 2014/0117767 A1 | 5/2014 | Yang |
| 2015/0162763 A1 | 6/2015 | Kimura et al. |
| 2016/0268819 A1 | 9/2016 | Han et al. |
| 2018/0041052 A1* | 2/2018 | Nakamoto ........... H02J 7/0016 |
| 2018/0198294 A1* | 7/2018 | Sheeks ................ G01R 31/392 |

FOREIGN PATENT DOCUMENTS

| | | | |
|---|---|---|---|
| EP | 2083511 A1 | * | 7/2009 |
| EP | 2658027 A1 | | 10/2013 |
| JP | 2012090485 A | | 5/2012 |
| KR | 20140119173 A | | 10/2014 |
| WO | 2017179414 A1 | | 10/2017 |

\* cited by examiner

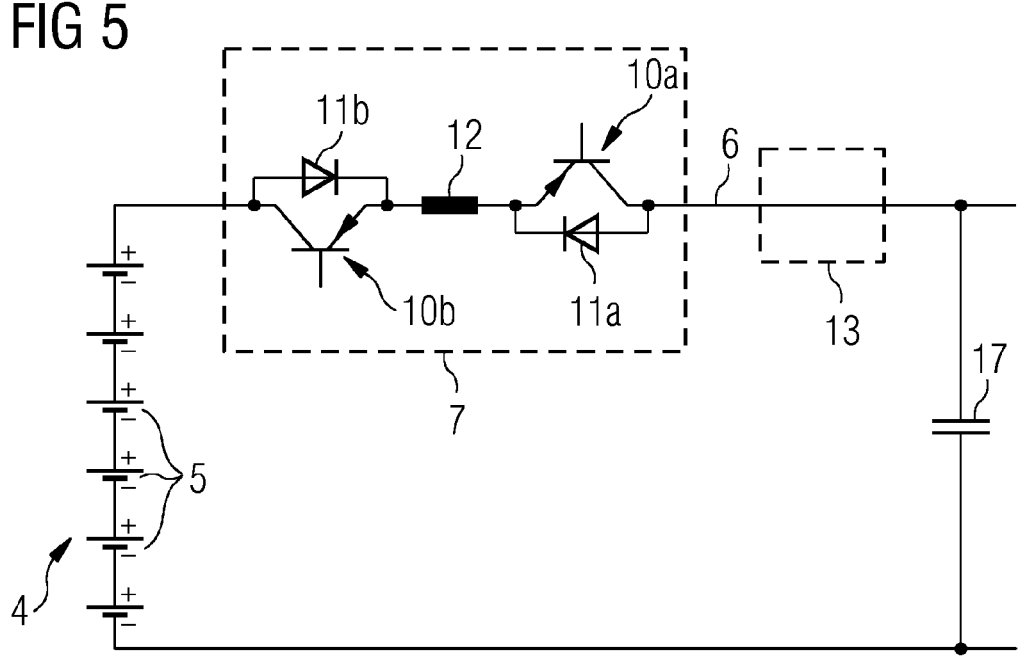
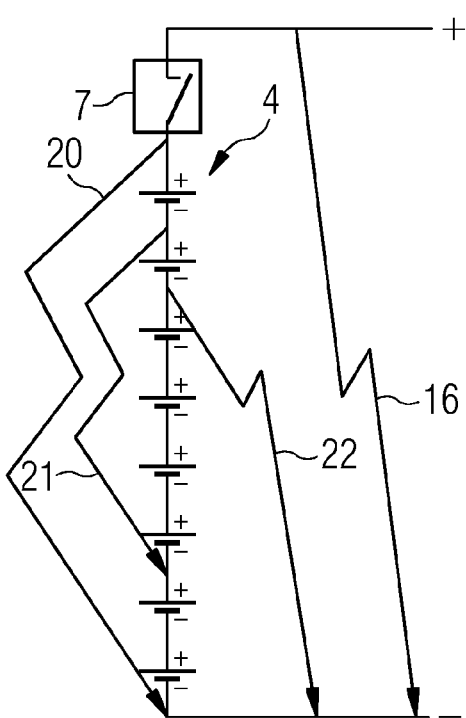 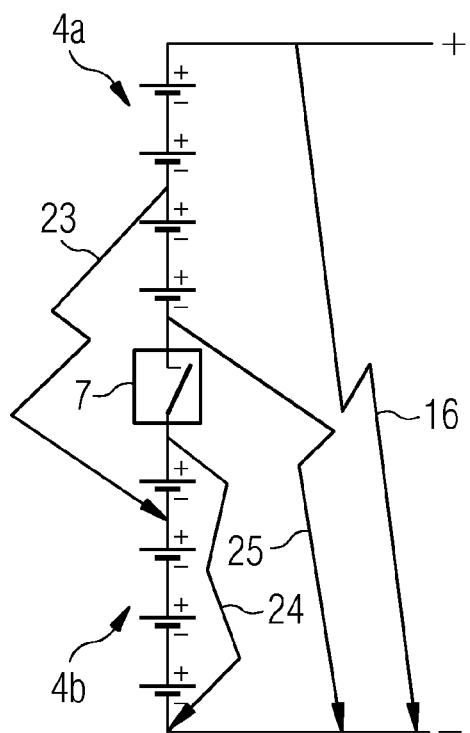

ENERGY STORAGE SYSTEM

CROSS REFERENCE TO RELATED APPLICATIONS

This application is the US National Stage of International Application No. PCT/EP2018/058144 filed Mar. 29, 2018, and claims the benefit thereof. The International Application claims the benefit of United Kingdom Application No. GB 1705518.7 filed Apr. 5, 2017. All of the applications are incorporated by reference herein in their entirety.

FIELD OF INVENTION

This invention relates to an energy storage system, in particular a system comprising electrochemical energy storage devices for storing electrical energy for an end user.

BACKGROUND OF INVENTION

Stored electrical energy modules, or power units of various types are becoming increasingly common in many applications, in particular for use where there are environmental concerns relating to emissions in sensitive environments, or public health concerns. Stored electrical energy power units are typically used to provide electrical energy to operate equipment, to avoid emissions at the point of use, although that stored energy may have been generated in many different ways. Stored electrical energy may also be used to provide peak shaving in systems otherwise supplied from the grid, or from various types of power generation system, including diesel generators, gas turbines, or renewable energy sources. Aircraft, vehicles, vessels, offshore rigs, or rigs and other powered equipment in remote locations are examples of users of large scale stored electrical energy. Vehicle drivers may use the stored energy power unit in city centres and charge from an internal combustion engine on trunk roads, to reduce the harmful emissions in the towns and cities, or they may charge up from an electricity supply. Ferries which carry out most of their voyage relatively close to inhabited areas, or in sensitive environments are being designed with hybrid, or fully electric drive systems. Ferries may operate with stored energy to power the vessel when close to shore, using diesel generators offshore to recharge the batteries. In many Scandinavian countries the availability of electricity from renewable energy sources to use to charge the stored energy unit means that a fully electric vessel may be used, provided that the stored energy units are sufficiently reliable for the distances being covered, with no diesel, or other non-renewable energy source used at all. Whether hybrid, or fully electric, the stored energy units may be charged from a shore supply when docked. The development of technology to achieve stored energy units that are reliable enough for prolonged use as the primary power source must address certain technical issues.

SUMMARY OF INVENTION

In accordance with a first aspect of the present invention, an energy storage system, comprises one or more energy storage units, each energy storage unit comprising one or more energy storage modules, each energy storage module comprising a plurality of electrochemical energy storage devices connected in series; wherein the system further comprises a DC switching device in series with the or each energy storage unit; wherein the DC switching device comprises a semiconductor device and a rectifying unit in parallel with the semiconductor device.

The switching device may further comprise a current limiter in series with the semiconductor device and parallel rectifying unit.

The switching device may further comprise a further semiconductor device and parallel rectifying unit, in series with the current limiter, the further semiconductor device and parallel rectifying unit being inverted with respect to the semiconductor device and parallel rectifying unit.

The current limiter may comprise an inductance.

The semiconductor device may comprise a transistor, in particular an insulated gate bipolar transistor, or a relay.

The rectifying unit may comprise one of a diode, bridge rectifier, relay, or thyristor.

Two or more strings in the energy storage module may be connected in parallel.

The energy storage unit may further comprise an isolator between the energy storage modules and the load to provide galvanic isolation.

An isolator is provided at both poles of the string.

The energy storage unit may further comprise a DC link capacitor in parallel with the energy storage modules.

The switching device may be located between two energy storage modules in the unit.

The switching device may be located between two energy storage modules at approximately a midpoint of the unit.

In accordance with a second aspect of the present invention, a method of controlling charging and discharging of two or more energy storage units comprising a plurality of energy storage modules electrically connected together, each energy storage module comprising a plurality of electrochemical energy storage devices connected in series; wherein the energy storage units are connected together in parallel comprises switching a switching device on for a predetermined period of time to allow a charge to flow into or out of the energy storage unit; switching the switching device off at the end of the predetermined time period; and repeating the switching on and switching off to control the average current for that unit.

The duty ratio of the switch, equal to time ON divided by (time ON+time OFF) may be chosen according to the system requirements.

BRIEF DESCRIPTION OF THE DRAWINGS

An example of an energy storage system according to the present invention will now be described with reference to the accompany drawings in which:

FIG. 5 illustrates an alternative embodiment of part of the example of FIG. 1 in more detail;

FIG. 6 illustrates various fault conditions for an energy storage unit; and,

FIG. 7 illustrates an improvement according to the present invention.

DETAILED DESCRIPTION OF INVENTION

Figure 1:
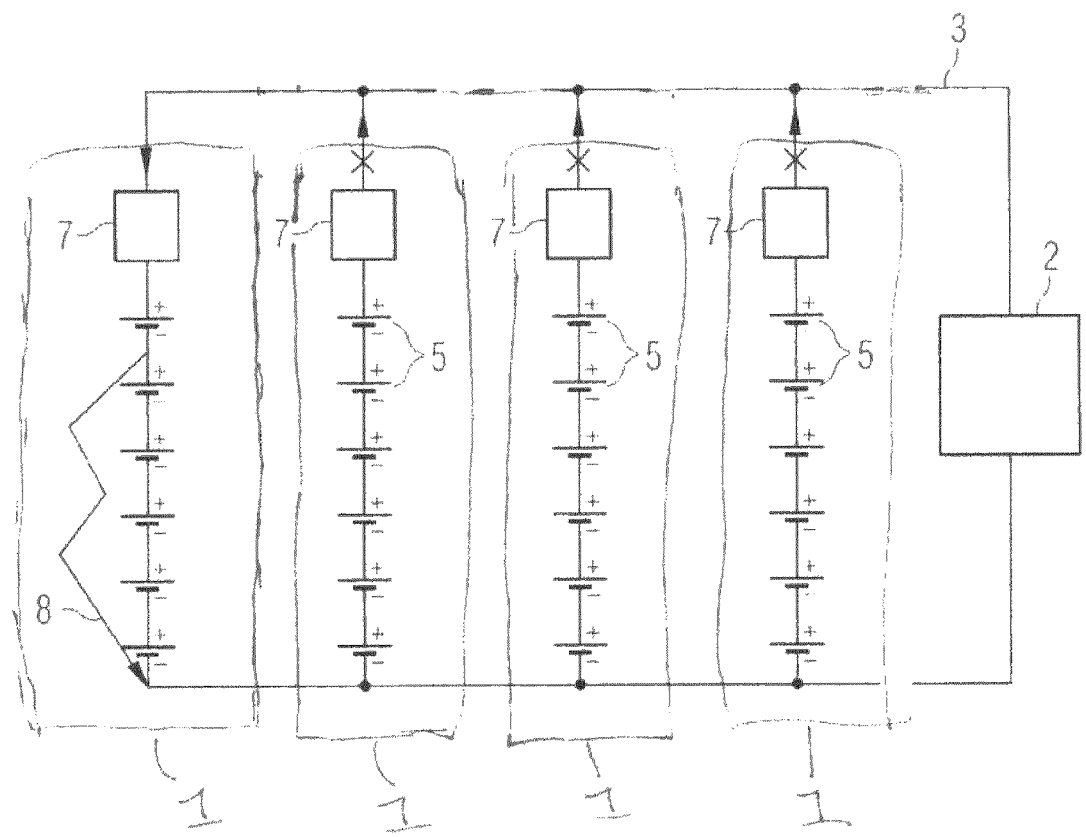
FIG. 1 illustrates an example of an energy storage system according to the present invention.

Electrical energy storage modules based on electrochemical cells, such as batteries are already in use, for example in hybrid, or electric vehicles. Early large scale batteries were lead acid, but more recently, lithium ion batteries have been developed for electrical energy storage for large scale applications. Li-ion batteries are typically pressurised and the electrolyte is flammable, so they require care in use and storage. There are strict regulations in the marine and offshore industries regarding risk to the vessel or rig. In addition, for marine and offshore applications, weight and volume of any equipment is severely restricted, leading to compact, lightweight systems being advantageous. It is a challenge to produce a compact, lightweight, system that achieves the required thermal isolation and cools the cell in which excess heating occurs, quickly and efficiently.

The present invention is described with respect to the example of Li-ion batteries, but is equally applicable to any other type of electrochemical cell based energy storage device, such as alkaline, or NiMh, or others, as well as to other energy storage technologies, such as capacitors, supercapacitors or ultracapacitors.

An electrical energy storage system comprises at least one energy storage unit, each energy storage unit comprising a plurality of energy storage modules electrically connected together in series, or parallel. A module may comprise a plurality of electrical energy storage devices connected together in series. The energy storage unit may be connected to other components of an electric system, such as a generator, or a connector to another source of energy to charge the energy storage devices and to one or more consumers, such as a propulsion system, or lighting, or drilling equipment, for which the devices of the energy storage module are a source of energy.

In the event of a fault occurring somewhere in the electrical system, for example a short circuit, the strings of energy storage modules (and the energy storage devices within them) may contribute to the total short circuit current, i.e. behaving in a similar way to a generator. The fault current may damage both the module itself and/or other parts of the system, as well as being potentially hazardous for people. In order to minimise the impact of an overload, or a short circuit in the system, DC current interruption components are provided in the unit, such as fuses, or circuit breakers, but these may be bulky and expensive, and it is often difficult to guarantee a safe fault current interruption.

Within a power supply of a vessel, or offshore platform, there may be a plurality of energy storage units in parallel and energy storage modules in series, or parallel, within each unit to achieve the high voltages required for certain applications, such as powering propulsion systems. In this example, one energy storage module may comprise strings of energy storage device giving a total voltage in the module of up to 150V and a plurality of energy storage modules together in a unit may produce a power supply that can operate at 500V DC to 1000V DC, or higher, depending on the number of modules per unit. The energy storage modules 3 are typically provided with a closed loop cooling system providing a flow of cooling fluid from a cooling unit, which cools and re-circulates the fluid that has been warmed by passage over the energy storage modules.

An example of an energy storage system according to the present invention is shown in FIG. 1. Multiple energy storage units 1 are electrically connected to a load 2 via a DC bus 3. The system 1 may comprise a single unit 1 comprising a plurality of energy storage modules, 5, then unit being connected to the DC bus 3 via a switching device 7, or as shown in this example, the module may comprise a plurality of units in parallel. In the event of a fault, for example a short circuit 8 in the first unit 1, the switching devices 7 disconnect the remaining strings from the DC bus 6, preventing these remaining strings from contributing to the short circuit current.

Figure 2:
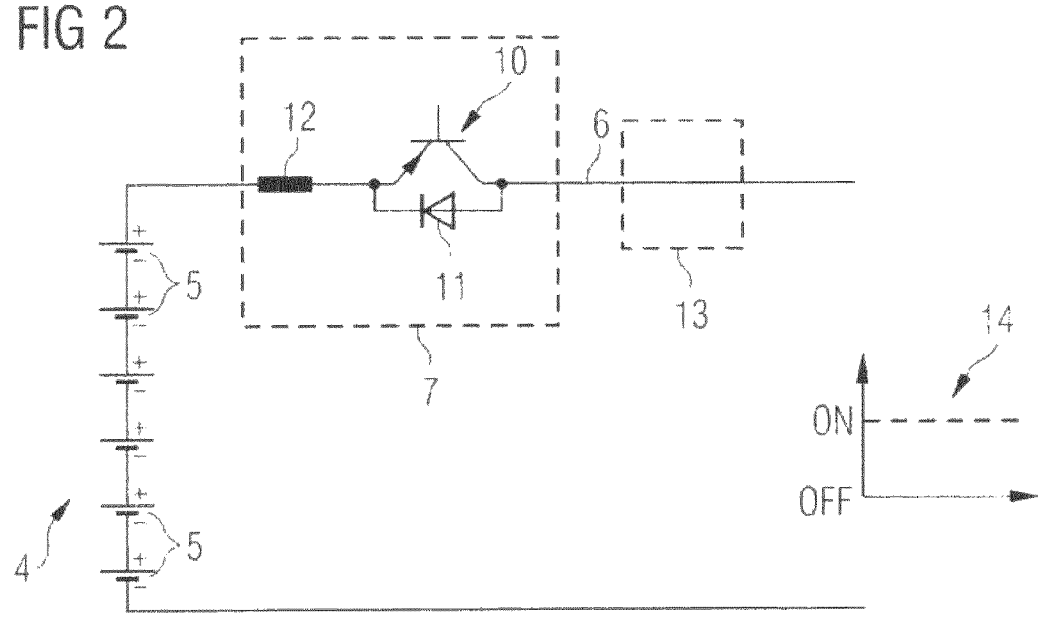
FIG. 2 illustrates part of the example of FIG. 1 in more detail, in normal operation.

The switching device 7 itself may take one of a number of different forms. These are illustrated in more detail in FIGS. 2 to 5. In its simplest form, a single static switch, in the form of a semiconductor device, typically a transistor, such as an insulated gate bipolar transistor (IGPT) in parallel with a rectifying unit, such as a diode 11, for example a freewheeling diode, may be connected in series between the string and the DC bus 6. Other types of rectifying unit include a thyristor, rely, or bridge rectifier. With a single transistor and diode arrangement, current flow in one direction can be controlled, whilst current flow in the other direction is uncontrolled. In a more complex embodiment, using multiple static switches, for example, as shown in FIG. 5, it is possible to control the current flow both out into and out of the unit. An advantageous arrangement for single direction control is illustrated in FIG. 2. As well as the transistor 10 and diode 11 in parallel, this embodiment comprises a current limiter 12, in this case an inductor.

Figure 3:
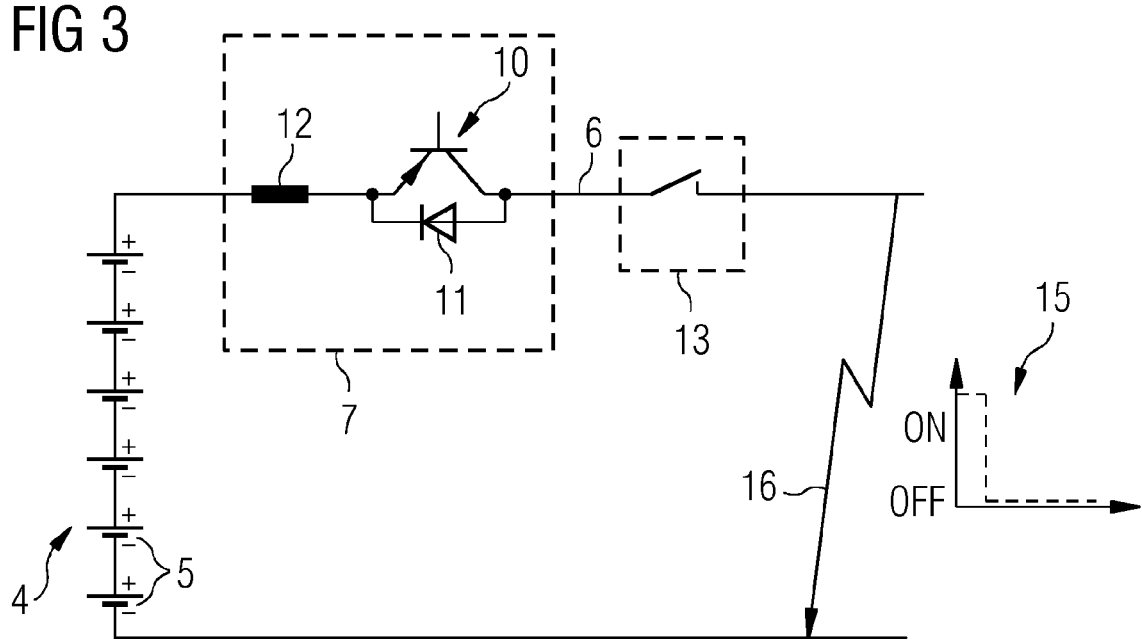
FIG. 3 illustrates part of the example of FIG. 1 in more detail, in fault protection mode of operation.

In normal operation, the transistor is always ON, as illustrated by the graph 14 of FIG. 2, meaning that current can flow freely into or out of the unit, depending on the mode of operation. As can be seen in FIG. 3, in the event of a fault, such as short circuit 16, a large fault current may flow out of (or into) the unit, and the fault current is then shut down by the transistor 10 blocking the current, i.e. by the transistor 10 turning OFF, as illustrated in graph 15 of FIG. 3. The inductor 12, or other suitable current limiter, if present, limits the rate of rise of current (dI/dt) in the event of a fault, enabling the fault current to be blocked before it reaches its maximum amplitude.

As the switching device 10, 11 does not offer galvanic isolation after current interruption, an isolation switch 13 may also be provided in series with the switching device, in order to maintain effective galvanic isolation. Galvanic isolation between the string of modules in the unit and the load is provided at both poles, although, for simplicity, only shown at one pole in the figures. As this isolation switch 13 does not need to break current, it can be more compact, less complex and less expensive than using circuit breakers to protect the unit and an off the shelf component may be used. As shown in FIG. 3 in the event of a fault 16, once the current has been reduced to zero by the transistor, then the galvanic isolation switch 13 opens.

The present invention has a number of benefits. The switching device 7 operates extremely quickly, as it does not rely on mechanical parts operating. It may operate in less than 50 microseconds ($50*10^{-6}$ sec) from a fault occurring. Due to the inductor 12 that limits the rate of rise of current and the very rapid operating time, the fault current does not have time to reach a high level and thus can be safely controlled by the transistor. With such a rapid response, the contribution from the modules in the other units to the fault energy is effectively eliminated, significantly improving personnel safety as well as protecting equipment from damage.

As there is no contribution from the unit to the fault energy, this also means that an unlimited number of units 1 may be connected in parallel, whereas when using conventional slow-acting circuit breakers, or fuses, the total fault energy contribution limits how many units can be safely connected in parallel without exceeding the breaking capacity of the circuit breaker.

Another feature of the present invention is that the switching device 7 may be operated in a particular mode in order to pre-charge the DC circuit from the batteries via the switch 10, 11. In normal operation, the transistor is constantly ON, whilst when a fault event occurs, i.e. in fault protection mode, the transistor turns OFF, and remain, OFF. By switching the transistor ON and OFF repeatedly in a predetermined way, the switch 10, 11 may be used to perform a controlled pre-charge of the DC-link capacitors 17 that are present in all DC systems, to bring them from a discharged state up to the required system voltage in a controlled manner. By doing this, it is possible to avoid having a separate pre-charging circuit that conventional systems require, reducing component cost, complexity and cost. This can be seen in the example of FIG. 4. DC link capacitor 17 is charged by switching the transistor 10 between ON and OFF, as illustrated by the graph 18 in FIG. 4.

Figure 4:
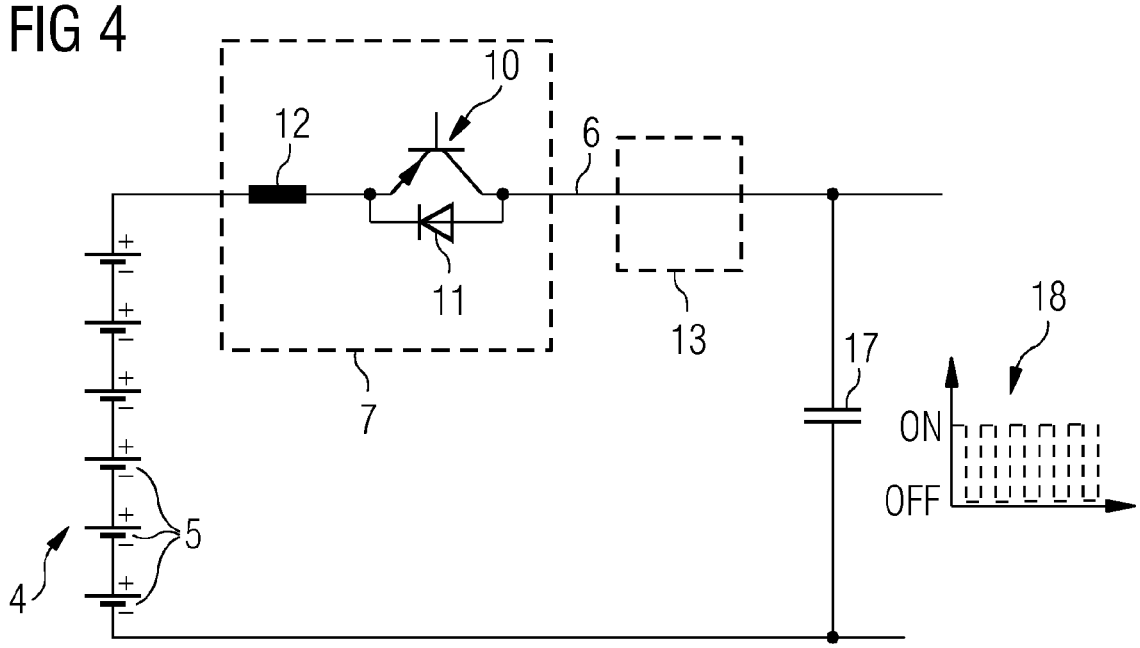
FIG. 4 illustrates part of the example of FIG. 1 in more detail, in pre-charging mode of operation.

Although a uni-directional switch 10 as shown in the examples of FIGS. 2 to 4 is less costly and complex, a bi-directional switch has the advantage that excess current flowing in either direction, into or out of the unit, may be controlled in an energy storage system using the bi-directional arrangement. This can be seen in more detail in FIG. 5. As before, one or more units 1 are connected in parallel to the DC bus 3. Instead of the current limiting inductance being connected between the unit and the transistor diode arrangement 10, 11, as in the previous examples, this embodiment additionally provides a further semiconductor device—rectifying unit pair, in this example embodied as an inverted transistor diode arrangement 10*b*, 11*b* between the unit and the inductor. Transistor diode pair 10*a*, 11*a* prevents current flow out of the unit when the transistor 10*a* is switched OFF and transistor diode pair 10*b*, 11*b* prevents current flow into the unit 1 when the transistor 10*b* is switched OFF. This arrangement may also be used for DC link capacitor pre-charging.

The switching device 10, 11 of the present invention may be used to limit short circuit currents or current ramp rates, or to control charging and discharging currents of units connected in parallel. The switching device may be switched on for a short period of time, allowing a limited amount of charge to flow into or out of the units (depending on system state), before it is switched off again. By repeating this, the average current (and also the peak current as the inductor will limit the current rise rate di/dt) may be controlled by choosing an appropriate duty ratio of the switch i.e. time ON divided by (time ON+time OFF). In this way it is possible to energize, or charge, the DC-link of the system at a selectable rate from one or multiple units. This method may also be used to even out imbalances in unit voltages, for instance, if one unit has been disconnected for servicing and the system is at a different state of charge when that unit is connected back in again. Imbalances between individual cells are dealt with separately. Controlling charging and discharging currents of energy storage units connected in parallel allows due account to be taken of the different properties of each unit, such as internal resistance and/or capacity, which may be caused for example by the units being of different ages.

Although the examples have been described with respect to batteries, other types of stored energy units, such as flywheels, supercapacitors and fuel cells may also benefit from the invention. For a vessel, or other system, relying on stored energy as its primary, or only power source, reliability is particularly important and optimising operating conditions is desirable. The detailed examples given are for batteries, or electrochemical cells, but the principle of the invention is applicable to other types of energy storage unit.

A further feature which may be used in combination with the present invention is the relocation of the switching device with respect to the unit. In the examples of FIGS. 1 to 5, the switching device is always shown as being located at the end of the unit closest to the DC bus and the load, either at the positive, or the negative terminal. This deals with a fault 16 across the terminals of the unit of the type illustrated in FIG. 3. However, if a fault 21, such as a cable short circuit, occurs between two points within a string of modules in the unit, or between a terminal and a point within the string of modules 20, 22, rather than wholly outside the string of modules, i.e. between the terminals 16, then isolating the fault is difficult. These different faults are illustrated in FIG. 6.

This problem is addressed by locating the switching device 7 at a point in the string 4, for example a mid-point of the string between one section 4*a* and another section 4*b* of the string, or by providing more than one switching device 7, at different points in the string (not shown). As illustrated in FIG. 6, the switching device 7 protects the circuit against faults between terminals (fault 16), but does not provide protection for faults between terminal and some point in the string (fault 20, 22), or between two internal points in the string (fault 21). Locating the switching device 7 within the string, whether at a mid-point, or another point away from the terminals, allows the faults 20, 21, 22 to be dealt with. In order to be able to handle faults 21, 22, the fault needs to occur over the string fuse as indicated in FIG. 7 by lines 23, 25. However, this is not always the case. For fault case 24, illustrating an internal short that does not occur over the switching device 7, then it is not possible to clear the fault, although there is still a benefit in that the maximum available voltage between the two potentials being shorted is reduced. For a switching device located at the mid-point of the string, this reduction is by 50% compared to the situation when the switching device is located at one or other terminal.

The invention claimed is:

1. An energy storage system, the system comprising:
   one or more energy storage units, each energy storage unit comprising at least two energy storage modules arranged in series, each energy storage module comprising a plurality of electrochemical energy storage devices connected in series;
   a DC switching device in series with and disposed between the at least two energy storage modules; wherein the DC switching device comprises a semiconductor device and a rectifying unit in parallel with the semiconductor device;
   wherein the DC switching device further comprises a current limiter in series with the semiconductor device and rectifying unit; and
   wherein the current limiter comprises an inductance operable to reduce a rate of increase of a DC current at the DC switching device.

2. The system according to claim 1, wherein the DC switching device further comprises a further semiconductor device and parallel rectifying unit, in series with the current limiter, the further semiconductor device and parallel rectifying unit being inverted with respect to the semiconductor device and parallel rectifying unit.

3. The system according to claim 1, wherein the semiconductor device comprises a transistor, an insulated gate bipolar transistor, or a relay.

4. The system according to claim 1, wherein the rectifying unit comprises one of a diode, bridge rectifier, relay, or thyristor.

5. The system according to claim 1, wherein the energy storage system comprises two or more energy storage units connected in parallel.

6. The system according to claim 1, wherein the energy storage unit further comprises an isolator between the energy storage modules and a load to provide galvanic isolation.

7. The system according to claim 1, wherein the energy storage unit further comprises a DC link capacitor in parallel with the energy storage modules.

8. The system according to claim 1, wherein the DC switching device is located between two energy storage modules at approximately a midpoint of the at least two energy storage modules.

9. A method of controlling charging and discharging of two or more energy storage units of the system according to claim 1, the method comprising:
- switching the DC switching device on for a predetermined period of time to allow a charge to flow into or out of each energy storage unit;
- switching the DC switching device off at the end of the predetermined time period; and repeating the switching on and switching off, to control the average current to or from that unit.

10. The method according to claim 9, wherein a duty ratio of the DC switching device, equal to time ON divided by (time ON+time OFF), is chosen according to requirements of the system.

* * * * *